United States Patent [19]

Seo et al.

[11] Patent Number: 5,619,480
[45] Date of Patent: Apr. 8, 1997

[54] MAGNETIC RECORDING MEDIUM AND RECORDING/REPRODUCING METHOD THEREFOR AS WELL AS INFORMATION PROCESSING APPARATUS BY MEANS THEREOF

[75] Inventors: Yuzo Seo, Kamakura; Shuichi Maeda, Hidaka, both of Japan

[73] Assignee: Mitsubishi Chemical Corporation, Tokyo, Japan

[21] Appl. No.: 256,141
[22] PCT Filed: Nov. 4, 1993
[86] PCT No.: PCT/JP93/01593
 § 371 Date: Aug. 8, 1994
 § 102(e) Date: Aug. 8, 1994
[87] PCT Pub. No.: WO94/11867
 PCT Pub. Date: May 26, 1994

(Under 37 CFR 1.47)

[30] Foreign Application Priority Data

Nov. 6, 1992 [JP] Japan ................................ 4-297076
Dec. 16, 1992 [JP] Japan ................................ 4-336279
Dec. 17, 1992 [JP] Japan ................................ 4-337536
Oct. 1, 1993 [JP] Japan ................................ 5-247136

[51] Int. Cl.$^6$ ........................ G11B 13/00; G11B 5/82
[52] U.S. Cl. ...................... 369/14; 360/137; 360/135; 428/65.3
[58] Field of Search ................................ 369/14, 52, 120, 369/121, 126, 275.1, 116; 360/25, 135, 69, 133, 137; 428/64, 65.3; 430/320, 321

[56] References Cited

U.S. PATENT DOCUMENTS

| | | | |
|---|---|---|---|
| 4,633,451 | 12/1986 | Ahn et al. | 369/14 |
| 4,843,494 | 6/1989 | Cronin et al. | 369/14 |
| 4,961,123 | 10/1990 | Williams et al. | 360/135 |
| 5,067,039 | 11/1991 | Godwin et al. | 369/14 |
| 5,210,672 | 5/1993 | Ivers et al. | 36/52 |
| 5,283,773 | 2/1994 | Thomas et al. | 369/14 |
| 5,363,255 | 11/1994 | Ivers et al. | 369/14 |

FOREIGN PATENT DOCUMENTS

| | | |
|---|---|---|
| 0257713 | 3/1988 | European Pat. Off. . |
| 0479547A2 | 4/1992 | European Pat. Off. . |
| 0484780A1 | 5/1992 | European Pat. Off. . |
| WO85/02933 | 7/1985 | WIPO . |

OTHER PUBLICATIONS

Database WPI, Derwent Publication, AN 78–65605A/37, FR 776066, Mar. 2, 1977.
Database WPI, Derwent Publications, AN 87–062179/09, JP–A–62 018 623, Jan. 27, 1987.
Database WPI, Derwent Publications, AN 93–097264/12, JP–A–05 040 931, Feb. 19, 1993.
Database WPI, Derwent Publications, AN 93–221715/28, JP–A–05 143 977, Jun. 11, 1993.
Database WPI, Derwent Publications, AN 94–169156/21, EP–A–598503, May 25, 1994.

*Primary Examiner*—Tan Dinh
*Attorney, Agent, or Firm*—Oblon, Spivak, McClelland, Maier & Neustadt, P.C.

[57] ABSTRACT

The present invention relates to a magnetic recording medium of a disk shape having a magnetic layer containing a magnetic material formed on a non-magnetic support and having, between the non-magnetic support and the magnetic layer, a layer containing a dye, of which the optical property changes by irradiation of energy rays, wherein in the above-mentioned layer containing a dye, continuous servo-signals based on the change of the optical property of the dye by irradiation of energy rays, are recorded on concentric tracks, and a recording/reproducing method therefor as well as an information processing apparatus. The magnetic recording medium of the present invention can be produced at a low production cost, has a large magnetically-recordable area and permits accurate tracking by a single detector.

19 Claims, 12 Drawing Sheets

MAGNETIC RECORDING MEDIUM AND RECORDING/REPRODUCING METHOD THEREFOR AS WELL AS INFORMATION PROCESSING APPARATUS BY MEANS THEREOF

TECHNICAL FIELD

The present invention relates to a magnetic recording medium suitable for tracking by an optical means and a recording/reproducing method therefor as well as an information processing apparatus by means thereof.

BACKGROUND ART

Floppy disk devices are used in a large quantity for information recording of e.g. computers or wordprocessors. Usual floppy disk devices had a problem that since positioning of the head is conducted by an open loop control using a step motor (control without feedback), positioning precision is poor, and it is impossible to increase the track density.

In recent years, it has been proposed to provide grooves on a magnetic recording medium and monitoring the position of the head by reading the groove position by an optical sensor provided integrally with the head. According to this method, positioning of the head is conducted by a closed loop control (feedback control), whereby positioning precision can be improved, and it is possible to realize a track density higher by one figure than the conventional devices.

One example of a floppy disk utilizing this principle is shown in FIGS. 11 and 12. Reference numeral 19 indicates a floppy disk, and FIG. 12 is an enlarged view of a part of the magnetic recording medium 4 of FIG. 11. FIG. 14 is a cross-sectional view vertical to the medium plane, illustrating a servo-signal reading system of an optical track servo-mechanism. On the surface of the magnetic recording medium 4, numerous pits 5 are formed in accordance with a track pitch. Through an aperture formed in the center of a head 6, a light from a light-emitting element 8 is projected on the surface of the magnetic recording medium 4. Tracking is carried out by reading a reflected light thereof by a light receptor 10 via an optical system 9.

An optical detector and a tracking error detecting circuit used for this purpose are shown in FIGS. 13 and 15, respectively. In the following description, P represents a track pitch.

The light receptor 10 is composed of four unit elements arranged in a square lattice pattern and upon receiving the above-mentioned reflected light, outputs four signals A to D. When the head is located at the track position (radius R), signal B is deducted from signal A by a differential amplifier 11 to obtain a signal proportional to $\cos(2\pi R/P)$. Likewise, signal D is deducted from signal C by a differential amplifier 12 to obtain a signal proportional to $\sin(2\pi R/P)$. On the other hand, binary codes for target value T are input to address terminals of ROM 13 and 14 in which a sin table and a cos table are written, to prepare binary codes representing $\sin(2\pi T/P)$ and $\cos(2\pi T/P)$. These binary codes are converted to analogue signals by multiplication type DA converters 15 and 16, and at the same time, their multiplication with the above-mentioned signals $\sin(2\pi R/P)$ and $\cos(2\pi R/P)$ obtained from the optical detector is conducted as shown by the following formulas, and then the difference is taken by a differential amplifier 17 whereby an error signal is obtained by an operation as shown by the following formulas.

$$\cos(2\pi T/P)\sin(2\pi R/P) - \sin(2\pi T/P)\cos(2\pi R/P) \quad (1)$$

$$= \sin((2\pi R/P) - (2\pi T/P)) \quad (2)$$

$$\approx 2\pi(R - T)/P \quad (3)$$

By feeding back this error signal to the tracking device, it is possible to carry out tracking with high precision with an error being almost 0. Such a tracking servo-device had problems such that two sets of detecting devices are required, the sizes of the devices are large, and costs required for their production are high.

A magnetic recording medium to be used for such a method is required to have grooves (pits) preliminarily formed on its surface. As a method for forming such grooves, a method of pressing to the medium a die having convexes formed to correspond to the grooves, to transfer the shapes of the die to the medium (stamping processing) and a method of irradiating a laser beam to decompose and remove part of the magnetic layer (laser processing) are known.

However, these methods have had problems such that in each case, the processing apparatus is extensive, a dust is generated during the processing and a cleaning step is therefore required, and the production costs are high. Further, the completed medium has grooves on its surface and thus has had a problem that such areas are not suitable for magnetic recording, whereby the recording capacity is reduced. Furthermore, there has been a problem that the difference in the optical property due to the presence or absence of such grooves is small, the detecting sensitivity is low, or it is susceptible to the influence of noises.

DISCLOSURE OF THE INVENTION

The magnetic recording medium of the present invention is a magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, characterized in that, in the above-mentioned layer containing a dye, continuous servo-signals based on the change of the optical property of said dye by irradiation of energy rays are recorded on concentric tracks.

The recording/reproducing method for a magnetic recording medium of the present invention is a recording/reproducing method for a magnetic recording medium, which comprises recording/reproducing magnetic data by means of a magnetic recording medium of a disk shape having a magnetic layer containing a magnetic material formed on a non-magnetic support, characterized in that using, as said magnetic recording medium, a magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, wherein in the above-mentioned layer containing a dye, continuous servo-signals based on the change of the optical property of said dye by irradiation of energy rays are recorded on concentric tracks, recording/reproducing of the magnetic data is conducted while tracking of a magnetic head is conducted by means of servo-signals detected by an optical means from the layer containing a dye.

The information treating apparatus of the present invention is an information processing apparatus for recording/ reproducing magnetic data while tracking a magnetic head by means of servo-signals detected by an optical means from a magnetic recording medium, characterized in that a means is provided to read the above-mentioned servo-signals from a magnetic recording medium of a disk shape having a magnetic layer containing a magnetic material formed on a non-magnetic support and having, between the non-magnetic support and the magnetic layer, a layer containing a dye, of which the optical property changes by irradiation of energy rays, wherein in the above-mentioned layer containing a dye, continuous servo-signals based on the change of the optical property of said dye by irradiation of energy rays, are recorded on concentric tracks.

BEST MODE FOR CARRYING OUT THE INVENTION

Figure 1:
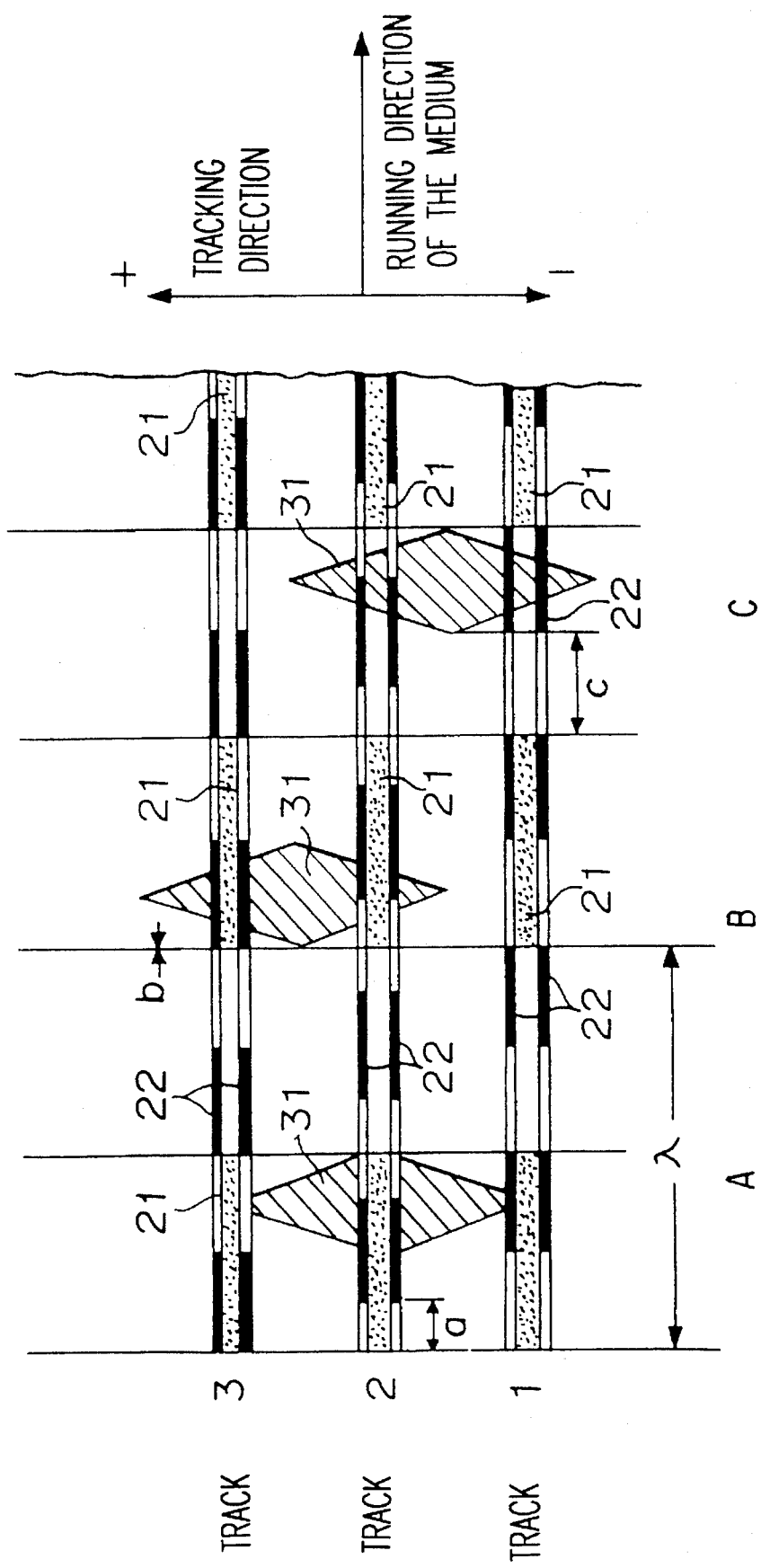
FIG. 1 is a schematic view illustrating a first embodiment in which a servo-signal pattern of a magnetic recording medium of the present invention is read by a detector.

The magnetic recording medium of the present invention is a magnetic recording medium of a disk shape having a magnetic layer containing a magnetic material formed on a non-magnetic support and having, between the non-magnetic support and the magnetic layer, a layer containing a dye, of which the optical property changes by irradiation of energy rays (a dye-containing layer), characterized in that, in the above-mentioned dye-containing layer, continuous servo-signals based on the change of the optical property of the dye by irradiation of energy rays, are recorded on concentric tracks.

In the magnetic recording medium of the present invention, the optical property of the dye-containing layer changes by irradiation with energy rays such as laser beam, electron beam or ultraviolet rays. Accordingly, optically detectable servo-signals can easily be recorded on a medium by conducting irradiation of energy rays in correspondence with servo-signals to be recorded, whereby writing of optical signals can be done.

As a method for irradiating energy rays to write optical signals into the dye-containing layer, it is possible to employ a method of irradiating a laser beam focused to have a certain spot diameter, for example, by an optical system, or irradiating a light beam (such as a strobo light or ultraviolet rays) or an electron beam through a mask having light-shielding areas and light transmitting areas corresponding to the signals to be recorded.

The above-mentioned change of the optical property may, for example, be an increase of the light transmittance, a decrease of the light transmittance, an increase of the light reflectance or a decrease of the light reflectance. For example, in a case where a dye, of which the light transmittance increases by irradiation of energy rays, is used, an optical signal can be obtained from a portion where the light transmittance is high in the medium surface having a low light transmittance. Likewise, in a case where a dye, of which the light transmittance decreases by irradiation of energy rays, is used, an optical signal can be obtained from a portion where the light transmittance is low in the medium having a high light transmittance.

The dye to be used for the dye-containing layer is not particularly limited so long as its optical property changes by irradiation with energy rays and it is capable of effectively absorbing the irradiated energy rays, and it may optionally be selected for use.

In a magnetic recording medium, absorption of light by the magnetic layer decreases with an increase of the wavelength i.e. a ultraviolet range → a visible range → an infrared range. Accordingly, detection of a transmitted light becomes easy by employing a light within a range of from a visible range to an infrared range. Therefore, the dye to be used for the dye-containing layer is preferably the one having a light absorption within this range, and it is preferred to irradiate a laser having a wavelength within this range for writing an optical signal.

In the present invention, the one having the dye incorporated in a binder resin is preferably used as the dye-containing layer. However, the color-developing properties (the absorption wavelength and the absorbance) at that time may vary from those in an organic solvent in many cases. Therefore, it is preferred that a dye-containing layer having a dye incorporated into a binder resin, is formed into a film for evaluation of the absorbance characteristics. The maximum absorption wavelength ($\lambda$max) of the dye is preferably at least 600 nm, preferably at least 750 nm, more preferably from 750 to 900 nm, in the above-mentioned coated film. The reason why it is particularly preferred to employ a dye having $\lambda$max of from 750 to 900 nm, is that the change in the absorbance can be created by utilizing a heat decomposition by a commonly used laser having a wavelength of 780 nm or 830 nm.

As the dye, various known dyes of e.g. polymethine type, cyanin type, phthalocyanin type, naphthalocyanin type, azo type, anthraquinone type, naphthoquinone type, pyrylium type, azulenium type, squarylium type, indophenol type, indoaniline type and triallylmethane type, may be employed.

Among them, as a preferred dye, a polymethine type dye may be mentioned. As the polymethine type dye, a polymethine dye of the following general formula (I) is particularly preferred:

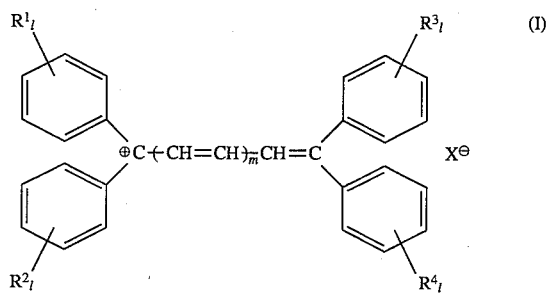

(in the general formula (I), each of $R^1$ to $R^4$, which may be the same or different, is a hydrogen atom, a halogen atom, a hydroxyl group, a carboxyl group, or a substituted or unsubstituted alkyl, amino, alkylamino, acyl, aryl, alkoxy, aralkyl, alkenyl or acyloxy group, X is an anion, m is 0, 1 or 2, and l is 1 or 2, provided that when l is 2, the plurality of $R^1$, $R^2$, $R^3$ and $R^4$ may be the same or different from each other).

In the above general formula (I), each of $R^1$ to $R^4$, which may be the same or different, is a hydrogen atom, a halogen atom, a hydroxyl group, a carboxyl group, or a substituted or unsubstituted alkyl, amino, alkylamino, acyl, allyl, alkoxy, aralkyl, alkenyl or acyloxy group. The alkyl group may, for example, be a methyl group, an ethyl group, a propyl group, a butyl group or an amyl group or may further be a substituted alkyl group such as a 2-hydroxyethyl group, a 2-sulfoethyl group, a 2-carboxyethyl group, or an alkyl group substituted by e.g. a halogen atom. As the amino group or the alkylamino group, a mono-substituted or di-substituted amino group which is substituted by e.g. a methyl group, an ethyl group or a benzyl group, especialy a di-substituted alkyl group, is particularly preferred.

In the above general formula (I), as $R^1$ to $R^4$, a hydrogen atom, a halogen atom (such as chlorine), an alkoxy group (such as a methoxy group or an ethoxy group), an amino group or an alkylamino group is preferred, and a dialkylamino group is particularly preferred.

In the above general formula (I), X is an anion, and for example, $ClO_4$, $BF_4$, $CH_3C_6H_4SO_3$, Cl or I may be mentioned.

The content of the dye in the dye-containing layer varies depending upon the type of the dye to be used, the thickness of the dye-containing layer, the performance of the light signal detector, etc., but may be such an amount that the light transmittance, the light reflectance or the like changes to a measurable extent by irradiation of energy rays. It is usually from 0.001 to 30 wt % in the dye-containing layer.

The dye-containing layer may contain additives such as an antistatic agent, a deterioration-preventing agent and a crosslinking agent within a range not to impair the effects of the present invention.

The dye-containing layer is formed between the non-magnetic support and the magnetic layer. Especially, in the present invention, the dye-containing layer is formed between the non-magnetic support and the magnetic layer, and in that dye-containing layer, continuous servo-signals based on the change on the optical property of the dye by irradiation of energy rays, will be recorded on concentric tracks.

As a method for forming the dye-containing layer between the non-magnetic support and the magnetic layer, a method may, for example, be mentioned wherein a dye solution having a dye dissolved or dispersed in a solvent, is a mixed with a binder resin, a dispersant, etc., as the case requires, to prepare a coating solution, which is coated directly or with another layer interposed, on the non-magnetic support before formation of the magnetic layer. As the coating method, commonly used various coating methods such as air doctor coating, blade coating, reverse roll coating and gravure coating, may be employed. Further, coating may be conducted by a method such as vapor deposition or transfer. As the resin, the solvent or the like to be used for the preparation of the coating solution, conventional materials may be used alone or in combination as a mixture, as will be described hereinafter.

As the non-magnetic support, a polyester such as polyethylene terephthalate or polyethylene naphthalate is usually employed in view of the excellent mechanical properties, heat resistance, electrical properties and chemical resistance. However, such a polyester film is poor in the adhesive property with the magnetic layer, since it has a high degree of crystal orientation. Therefore, in order to improve the adhesive property between the non-magnetic support and the magnetic layer, treatment with a surface modifier such as an alkali, an aqueous amine solution, trichloroacetic acid or a phenol may sometimes be applied to the surface of the non-magnetic support. In such a case, a dye may be mixed to the surface modifier, and a such a mixture may be coated on the non-magnetic support.

Further, an easily adhesive layer may sometimes be formed by means of various easily adhesive resins in order to improve the adhesion between the non-magnetic support and the magnetic layer. In such a case, a dye may be incorporated in such an easily adhesive layer. For example, a material having a dye blended to a conventional adhesive resin such as an acrylic resin, a polyurethane resin or a polyester resin may, usually, be adjusted as a coating solution, which is then coated on the magnetic layer side surface of the non-magnetic support. The thickness of the easily adhesive layer is usually from 0.005 to 5 μm as a dry film thickness.

Further, an interlayer containing an electrically conductive material and a binder resin may be formed between the magnetic layer and the non-magnetic support in order to improve the electrification property of the magnetic layer. In such a case, a method of incorporating a dye in such an interlayer, may be mentioned.

As the electrically conductive material, an electrically conductive metal powder or a metal compound may, for example, be mentioned. For example, a powder of a metal such as silver or platinum, or a powder of a metal compound such as tin oxide, zinc oxide or potassium titanate, may be used, although the electrically conductive material is not particularly limited. The average particle size of such a powder is preferably from 0.005 to 0.6 μm. With the magnetic recording medium provided with such an electrically conductive interlayer containing a dye, the electric resistance of the surface of the magnetic layer is low, and the amount of carbon black in the magnetic layer can be reduced, whereby it will be excellent in the light transmittance and suitable for writing and reproduction of light servo-signals. The thickness of such an interlayer is usually from 0.005 to 5 μm as a dry film thickness.

As elements other than the dye in the magnetic recording medium of the present invention, conventional materials may be used.

As the magnetic material to be used for the magnetic layer, various ferromagnetic powders including a powder of a ferromagnetic metal such as Fe, Ni or Co, or a magnetic alloy containing such a ferromagnetic metal as the main component, such as Fe, Ni, Co, a Fe-Co alloy, a Fe-Ni alloy, a Fe-Co-Ni alloy, a Fe-Ni-Zn alloy, a Fe-Co-Ni-Cr alloy or a Co-Ni alloy, an iron oxide magnetic powder such as $\gamma\text{-}Fe_2O_3$, $Fe_3O_4$, Co-containing $\gamma\text{-}Fe_2O_3$ or Co-containing $Fe_3O_4$, and a metal oxide type magnetic powder such as $CrO_2$, barium ferrite or strontium ferrite, may be mentioned. From the viewpoint of the light transmittance, etc., barium ferrite is particularly preferred.

The amount of the magnetic material to be used, is preferably such that the content in the magnetic layer will be from 50 to 90 wt %, particularly from 55 to 85 wt %, as the amount of the ferromagnetic powder.

As the binder resin to be used for the magnetic layer, the one which is excellent in the adhesion with the support and in the abrasion resistance, is suitably used. For example, a polyurethane resin, a polyester resin, a cellulose derivative such as a cellulose acetate butyrate, cellulose diacetate or nitrocellulose, a vinyl chloride type resin such as a vinyl chloride-vinyl acetate copolymer, a vinyl chloride-vinylidene chloride copolymer or a vinyl chloride-acrylic copolymer, various synthetic rubbers such as a styrene-butadiene copolymer, an epoxy resin or a phenoxy resin may be mentioned. These resins may be used alone or in combination as a mixture of two or more of them.

The binder resin is preferably used so that the content in the magnetic layer would be from 2 to 50 wt %, particularly from 5 to 35 wt %.

In the magnetic coating material, a low molecular weight polyisocyanate compound having a plurality of isocyanate groups, may be incorporated, so that a three dimensional network structure will be formed in the magnetic layer to improve the mechanical strength. As such a low molecular weight polyisocyanate compound, a trimethylol propane adduct of tolylenediisocyanate may, for example, be mentioned. Such a low molecular weight polyisocyanate compound is preferably used in an amount of from 5 to 100 wt % relative to the binder resin.

Further, to the magnetic coating material to form the magnetic layer, various additives such as a lubricant, an abrasive agent, an antistatic agent, a dispersant, etc., may be incorporated, as the case requires.

Here, as the lubricant, various lubricants of e.g. an aliphatic type, a fluorine type, a silicone type or a hydrocarbon type, may be used. As the aliphatic lubricant, a fatty acid, a metal salt of a fatty acid, a fatty acid ester, a fatty acid amide or an aliphatic alcohol may, for example, be mentioned. As the fatty acid, oleic acid, lauric acid, myristic acid, palmitic acid, stearic acid or behenic acid may, for example, be mentioned. As the metal salt of a fatty acid, a magnesium salt, an aluminum salt, a sodium salt or a calcium salt of such a fatty acid may, for example, be mentioned. As the fatty acid ester, a butyl ester, an octyl ester or a glyceride of the above-mentioned fatty acid may, for example, be mentioned. As the fatty acid amide, an amide of the above-mentioned acid as well as linolic acid amide or caproic acid amide may, for example, be mentioned. As the aliphatic alcohol, lauryl alcohol, myristyl alcohol, palmityl alcohol, stearyl alcohol or oleyl alcohol may, for example, be mentioned. As the fluorine type lubricant, a perfluoroalkyl polyether or a perfluoroalkyl carboxylic acid may, for example, be mentioned. As the silicone type lubricant, silicone oil or modified silicone oil may, for example, be mentioned. Further, a solid lubricant such as molybdenum disulfide or tungsten disulfide, or a phosphoric acid ester may, for example, be used. As the hydrocarbon type lubricant, paraffin, squalane or wax may, for example, be mentioned. The amount of the lubricant to be used is usually such that the content in the magnetic layer is within a range of from 0.1 to 20 wt %, preferably from 1 to 10 wt %. In a case where the magnetic layer is formed in two laminated layers, the content of the lubricant may be varied between the upper layer and the lower layer.

As the abrasive agent, alumina, molten alumina, corandom, silicone carbide, chromium oxide or silicone nitride may, for example, be mentioned. Among them, relatively hard material is preferably used. The number average particle size is preferably at most 2 μm. The amount of the abrasive agent to be used is preferably such that the content in the magnetic layer is within a range of from 1 to 20 wt %.

As the antistatic agent, a natural surfactant such as carbon black, graphite or saponin, a non-ionic surfactant such as an alkylene oxide type or a glycerine type surfactant, a cationic surfactant such as a higher alkylamine type, a quaternary ammonium salt type, pyridine or other heterocyclic type surfactant containing an acid group such as a carboxylic acid group, a sulfonic acid group, a phosphoric acid group, a sulfuric acid ester group or a phosphoric acid ester group, an amphoteric surfactant such as an amino acid type, an amino sulfonic acid type, a sulfuric acid or phosphoric acid ester of an amino alcohol type surfactant may, for example, be used. These surfactants may be used alone or in admixture. The amount of the antistatic agent to be used is usually such that the content in the magnetic layer is within a range of from 1 to 15 wt %. These materials are those useful as antistatic agents, but in some cases, they may be used for the purpose of improving the dispersibility or the lubricating property.

As the dispersant, a $C_{12-18}$ fatty acid such as capric acid, lauric acid, myristic acid, oleic acid or linolic acid, a metal soap composed of an alkali metal or alkaline earth metal salt of such a fatty acid, or lecithin, may, for example, be used. The amount of the dispersant is usually such that the content in the magnetic layer is within a range of from 0 to 20 wt %.

As the solvent to be used for kneading, dispersing or coating the magnetic coating material, a ketone such as methyl ethyl ketone, methyl isobutyl ketone or cyclohexanone, an alcohol such as methanol, ethanol, propanol or isopropyl alcohol, an ester such as methyl acetate, ethyl acetate or butyl acetate, an ether such as diethyl ether or tetrahydrofuran, an aromatic hydrocarbon such as benzene, toluene or xylene, or an aliphatic hydrocarbon such as hexane, may, for example, be mentioned.

With respect to the method for kneading or dispersing, or the order of adding the respective components, conventional methods commonly used for kneading or dispersing the magnetic coating material, may be employed.

As the non-magnetic support, various plastics such as, a polyester such as polyethylene terephthalate or polyethylene naphthalate, a polyolefin such as polypropylene or polyethylene, a cellulose derivative such as cellulose acetate, polycarbonate, polyamide and polyimide, may, for example, be used.

As a method for coating the magnetic coating material directly or with another layer interposed, on the non-magnetic support, various methods commonly used, such as air doctor coating, blade coating, reverse coating and gravure coating, may be employed. In a case where magnetic coating materials are coated in a plurality of layers, the coating solution of the lower layer and the coating solution for the upper layer may simultaneously be coated in wet states, or the respective layers may sequentially be coated. The thickness of the magnetic layer is usually from 0.1 to 10 μm, preferably from 0.3 to 2 μm, as the thickness after drying.

Further, a top coating layer for imparting a lubricating property or a back coating layer for antistatic purpose may be formed.

Further, if necessary, orientation treatment, random treatment or smoothing treatment may be carried out.

The magnetic recording medium of the present invention is characterized in that in the dye-containing layer formed between the non-magnetic support and the magnetic layer, continuous servo-signals based on the change of the optical property of the dye by irradiation of energy rays, are recorded on concentric tracks.

Servo-signals may be recorded by forming areas where the optical property of the dye has changed by irradiation of energy rays, on the concentric tracks of the dye-containing layer. The areas where the optical property of the dye has changed, may be continuously formed on the tracks, or an area where the optical property of the dye has changed and an area where no such change has occurred may be formed alternately. Further, the areas where the optical property of the dye has changed may be formed so that signals containing one type of a frequency component are obtained as the servo-signals, or the areas where the optical property of the dye has changed, may be formed so that signals containing two types of frequency components, may be obtained.

Here, the case where the areas in which the optical property of the dye has changed, are provided so that signals containing two types of frequency components, may be obtained as the servo-signals, will be described in detail.

The signals containing two types of frequency components as the servo-signals may be recorded on one servo track, or two types of signals differing in the frequency may respectively be recorded at spatially different close positions. In the latter case, the two signals may be detected simultaneously by means of a single detector, whereby it is possible to obtain signals having two types of frequency components superposed on each other. The servo-signals read by an optical means by the detector, will be separated into the respective frequency components by a frequency separating means, and from such frequency components, an error signal for detecting a tracking error, can be obtained, whereby accurate tracking will be possible.

The above-mentioned respective frequency components are recorded so that they have sequentially mutually different phase servo-signals among the respective servo-tracks. In such a case, the present head position can be detected by measuring the phase servo-signals, and the head position can be controlled so that the measured values will be the prescribed values.

FIG. 1 illustrates one embodiment of the magnetic recording medium of the present invention, and shows the manner of reading a signal 21 having a long wavelength and a signal 22 having a short wavelength by a detector 31. In the embodiment illustrated in FIG. 1, signals 21 and 22 are recorded at different close positions on the surface of the medium. The signals thus recorded to be close to each other will be mixed at the time of the reproduction, and a signal representing the sum of the two will be output from the detector. The wavelength of the signal 22 is adjusted to be ½ of the wavelength ($\lambda$) of the signal 21, and the signals are recorded so that the phase of the signal 21 is sequentially different from one track to the next. In FIG. 1, the signals are recorded so that the phase difference between the signal 21 and the signal 22 will sequentially be different such that it is 0 in track 3 as shown at b, $\lambda/8$ in track 2 as shown at a and $\lambda/4$ in track 1 as shown at c. Of course, the phase difference sequentially provided among the tracks may optionally be selected, and phase differences both among signal 21 and among signal 22 may be provided among the tracks.

A shows a case where the detector 31 is located just above track 2. In this case, the signal d output by the detector 31 corresponds to the signal of track 2. If the detector moves upward and arrives at the position shown at B, a signal of track 3 will be mixed to the signal d of the detector, and the phase of the short wavelength component advances. Inversely, if the detector 31 moves downwardly and arrives at the position shown at c, the signal of track 1 will be mixed to the signal d of the detector, and the phase of the short wavelength component delays. Thus, the position of the detector can be detected as a phase difference. As the phase difference of the short wavelength component can thus be detected, accurate tracking can be conducted by moving the head so that the phase difference thus detected will fall within a predetermined range.

However, in a case where such two types of signals having different frequencies are to be recorded at spatially different close positions, respectively, a plurality of scanning will be required to write servo-signals in one track. Whereas, in a case where signals containing two types of frequency components are to be recorded on one servo-track, writing of servo-signals in one track can be carried out by a single scanning.

As a method for recording signals containing two types of frequency components on one servo track, there may, for example, be mentioned a method wherein trigonometric functions corresponding to the two types of signals are added, and the added size is analogically recorded in correspondence with the width of the servo track or it is converted into binary signals by PWM (pulse width modulation) and recorded, or a method wherein the servo track is divided into fine sections in a circumferential direction, and the respective frequency components will be sequentially recorded in the corresponding different recording sections.

Figure 2:
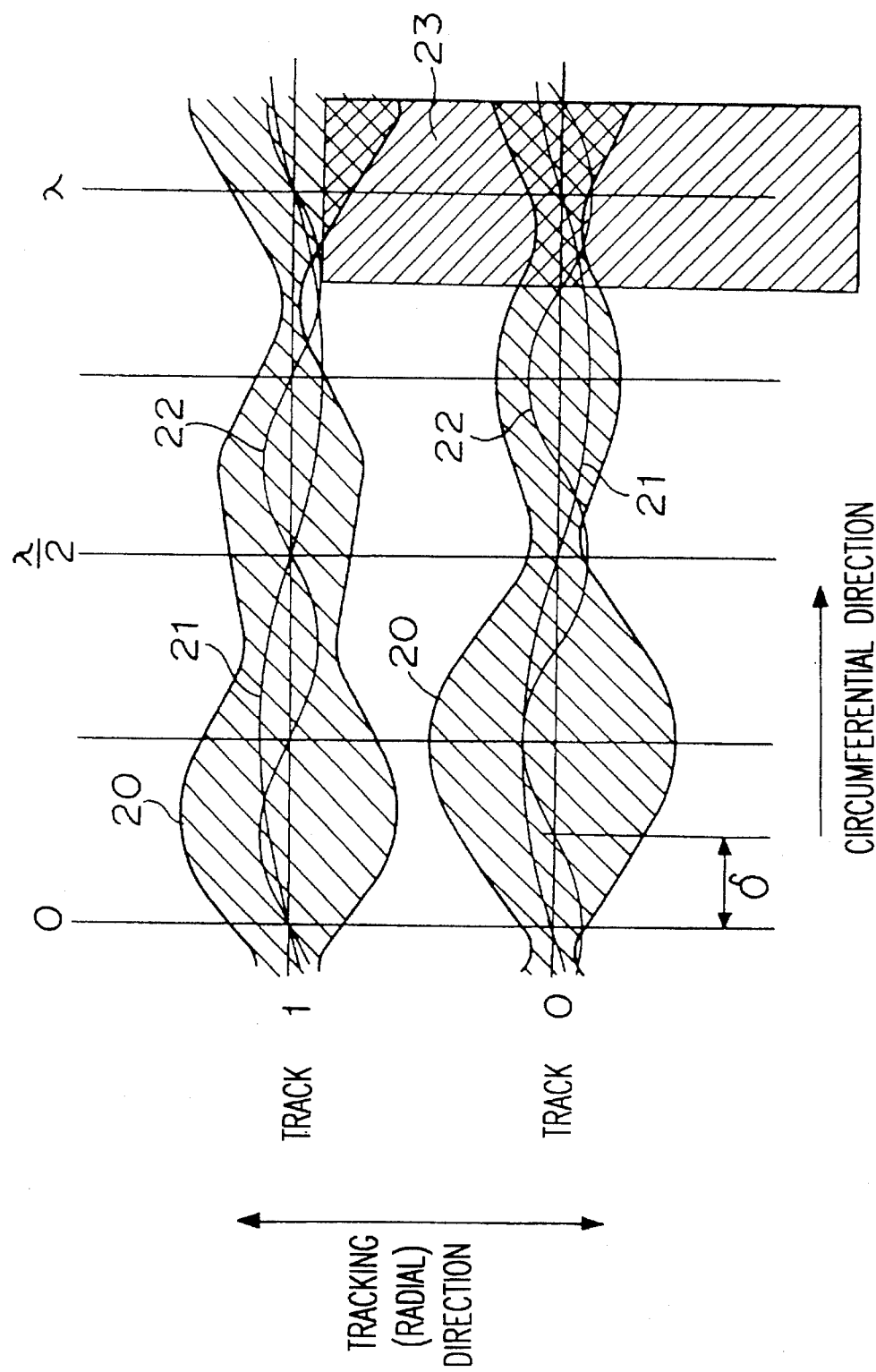
FIG. 2 is a schematic view illustrating a second embodiment in which a servo-signal pattern of a magnetic recording medium of the present invention is read by a detector.

FIG. 2 is a schematic view illustrating an enlarged part of one embodiment of a magnetic recording medium of the present invention in which servo-signals are recorded by changing the widths of the servo tracks. Along the circumferential direction of the magnetic recording medium, servo tracks 0 and 1 are provided. In FIG. 2, the areas shown by widely spaced oblique lines represent recorded areas in the tracks, and such areas are different from other areas in the optical properties such as the light reflectance and light transmittance. Other servo tracks are likewise provided, although they are not shown. The width of a servo track corresponds to the intensity of the signal 20 (biased and includes a constant portion), and said signal 20 is a combined signal of a plurality of frequency components i.e. a combined signal of the signal 21 having a long wavelength and the signal 22 having a short wavelength. In FIG. 2, the signals 21 and 22 are shown simply for the convenience of explanation. In reality, only their combined signal 20 is recorded.

Figure 3:
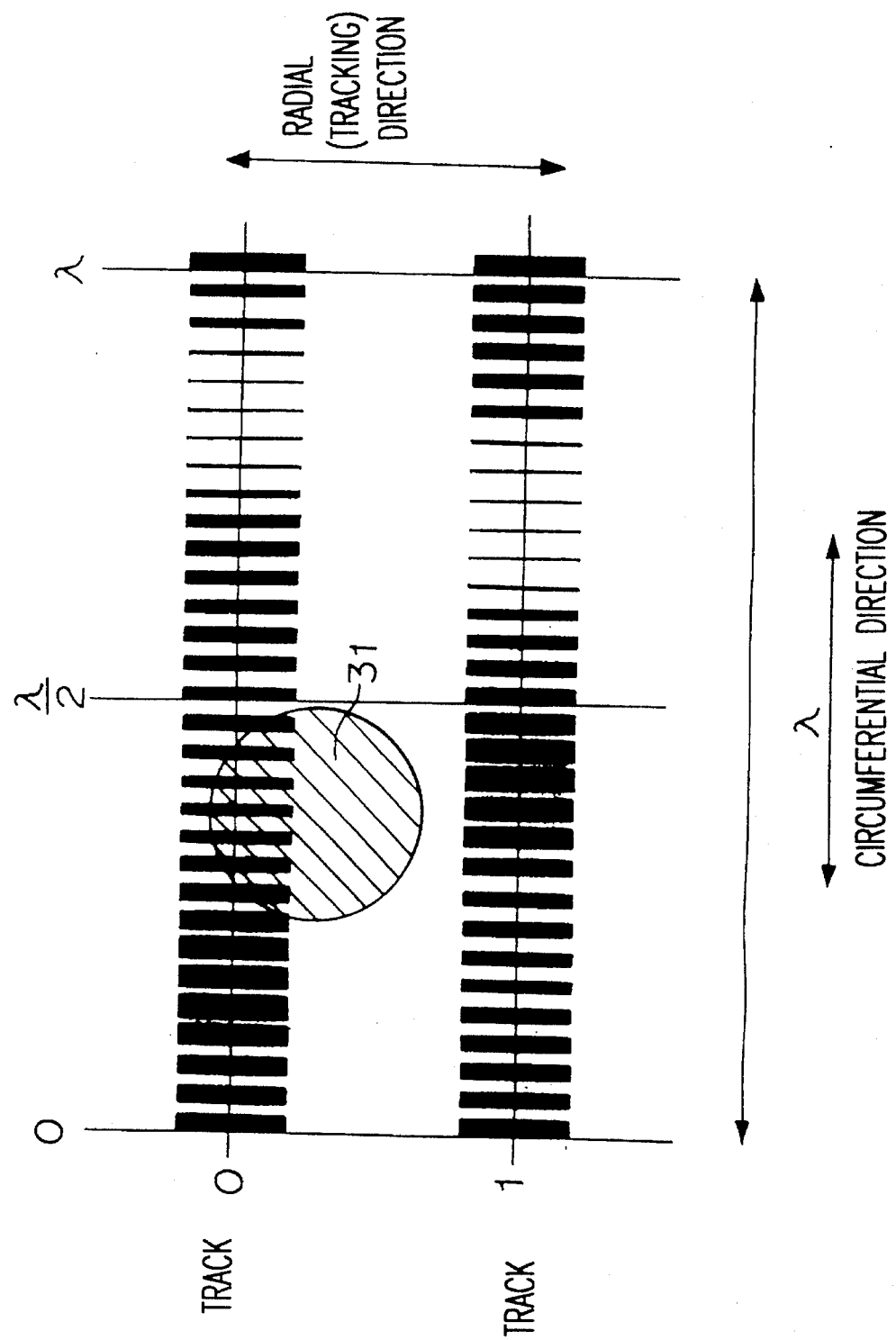
FIG. 3 is a schematic view illustrating a third embodiment in which a servo-signal pattern of a magnetic recording medium of the present invention is read by a detector.

FIG. 3 is a schematic view illustrating an enlarged part of one embodiment of the magnetic recording medium of the present invention in which servo-signals obtained by PWM modulation are recorded. In FIG. 3, the areas shown by black areas represent recorded areas in the tracks, and their widths in the circumferential direction correspond to the pulse widths of the signals obtained by PWM modulation. The recorded areas are different from other areas in the optical properties such as the light reflectance and the light transmittance.

Figure 4:
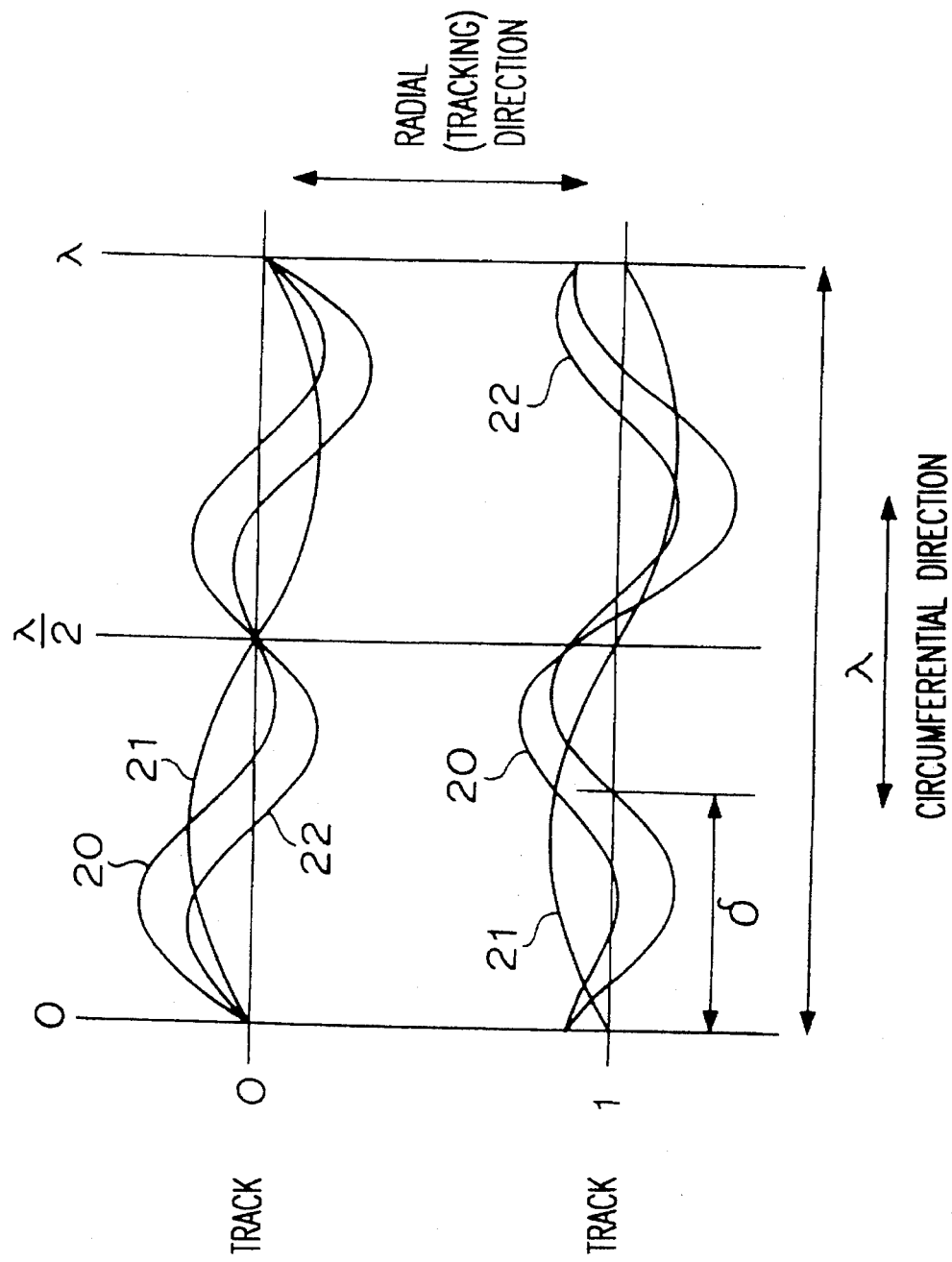
FIG. 4 is a conceptual view illustrating a state in which signals having two different frequency components are recorded on tracks.

FIG. 4 is a conceptual view illustrating a manner in which two signals having different frequencies are recorded in servo track 0 and servo track 1 on a magnetic recording medium. The signal 20 has as its frequency components a signal 21 having a long wavelength and a signal 22 having a short wavelength. In FIG. 4, the signals 21 and 22 are shown simply for the purpose of explanation, and in reality, only the signal 20 as their combined signal is recorded as modulated by PWM, as shown in FIG. 3.

In FIGS. 2 and 4, the signals 21 and 22 have common wavelengths $\lambda$ and $\lambda/2$, respectively, in the respective tracks. However, there is no particular restriction as to these wavelengths. The wavelengths may optionally be determined depending upon the required response characteristics, etc. Further, between the signals 21 and 22, a different phase difference is sequentially provided from one track to the next. Namely, in FIG. 2, the signal 21 has the same phase in tracks 0 and 1, whereas the signal 22 has a phase difference of $\delta$ between tracks 0 and 1. In such a manner, by setting the phase of the signal 21 to be equal in all tracks while sequentially differentiating the phase of the signal 22 by $\delta$, the phase difference between the signals 21 and 22 will sequentially be different by $\delta$ from one track to the next. Of course, there is no particular restriction as to the value for $\delta$, and it may optionally be selected. Otherwise, phase differences both among the signals 21 and among the signals 22 may be provided among tracks.

Figure 5:
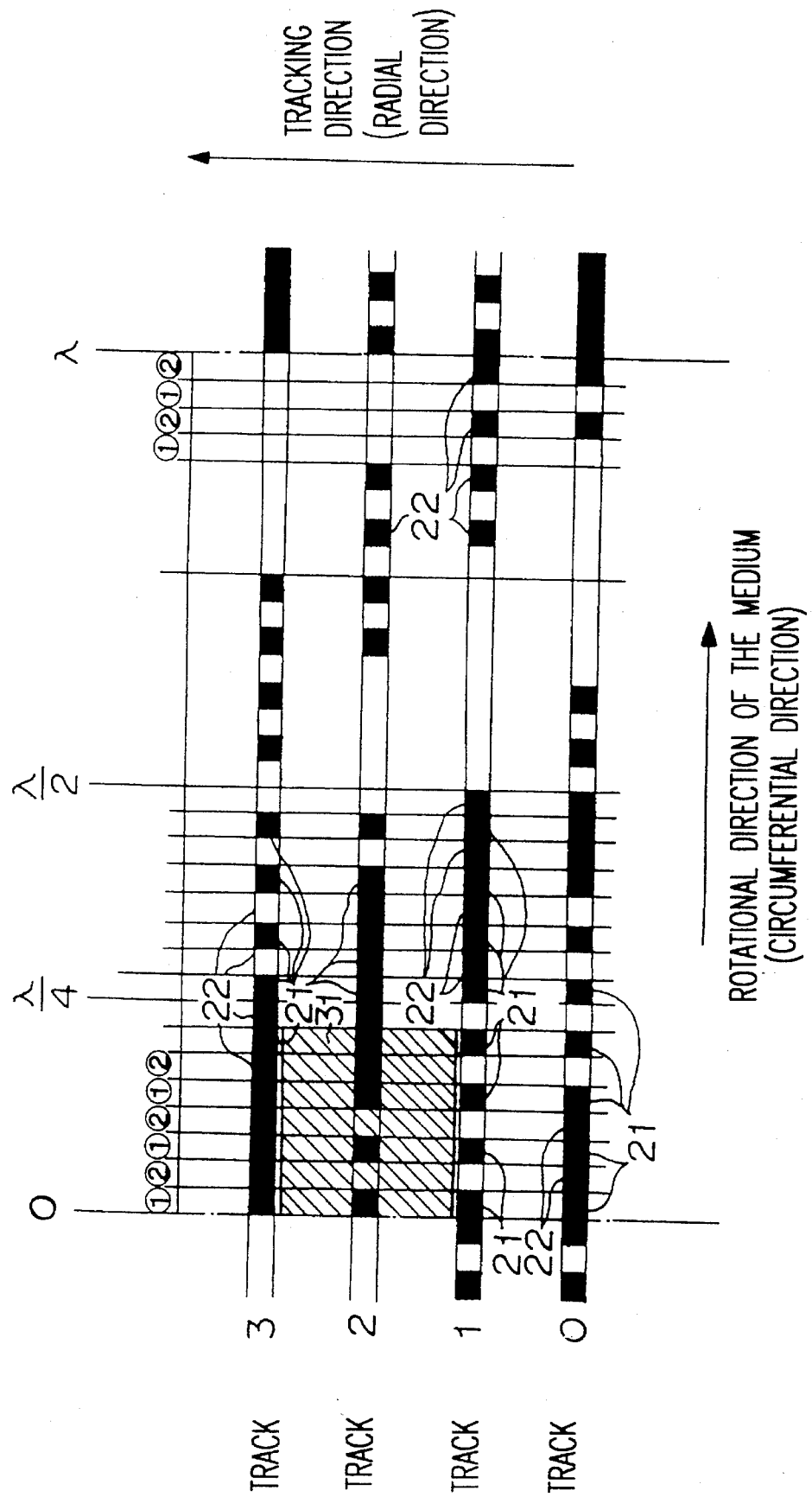
FIG. 5 is a schematic view illustrating a fourth embodiment wherein a servo-signal pattern of a magnetic recording medium of the present invention is read by a detector.

FIG. 5 is a schematic view illustrating an enlarged part of one embodiment of a magnetic recording medium of the present invention in which a plurality of frequency components are, respectively, recorded in the sections divided in the circumferential direction on the servo tracks.

FIG. 5 shows a manner in which optical signals having two types of frequency components i.e. the signal 21 having a long wavelength and the signal 22 having a short wavelength, which are recorded in the servo tracks 0 to 3 formed in the circumferential direction, are read from a detection site 31.

In the embodiment shown in FIG. 5, the servo tracks are divided in fine sections in the circumferential direction so that the areas for recording the two types of frequency components i.e. the signals 21 and 22, are formed alternately. In FIG. 5, ① shown above indicates a section in which the signal 21 having a long wavelength is to be recorded, and ② indicates a section in which the signal 22 having a short wavelength is to be recorded. ① and ② are divided in the circumferential direction and alternately formed. In track 1, with respect to the positions ① at which the signal 21 is to be recorded, continuous 8 sections from position 0 in the circumferential direction are in a recorded state (shown by a black area in the Figure), and the following 8 sections are blanc (shown by a blanc area in the Figure). By sequentially repeating such a recording pattern, a signal having a wavelength shown by $\lambda$ in the Figure will be obtained. With respect to the positions ② at which the signal 22 is to be recorded, in track 1, continuous four sections from distance 0 are blanc, and the following four sections are continuously in a recorded state, then, the subsequent four sections are likewise blanc, and four sections are in a recorded state. By repeating this recording pattern sequentially, a signal having a wavelength of $\lambda/2$ will be obtained.

The signals 21 and 22 have common wavelengths $\lambda$ and $\lambda/2$, respectively, in the respective tracks. However, there is no particular restriction as to these wavelengths, and they may optionally be selected depending upon the desired response characteristics, etc. Further, between the signals 21 and 22, sequentially different phase difference is provided from one track to the next. Namely, in FIG. 5, the signal 21 has the same phase in tracks 0 to 3, whereas the signal 22 has the phase sequentially changed by $\lambda/8$ among the tracks 0 to 3, whereby the phase difference between the signals 21 and 22 will be sequentially different by $\lambda/8$ from one track to the next. Of course, the difference in the phase difference sequentially provided from one track to the next is not limited to $\lambda/8$ and may optionally be selected. Further, phase differences both among the signals 21 and among the signal 22 may be provided among the tracks.

The widths of the sections divided in the circumferential direction on the servo tracks may simply be sufficiently be smaller than the wavelength of the respective frequency components, and by setting the widths of the sections to be adequately smaller than the detection range of the detector, a signal having the respective frequency components combined will be output from the detector. With magnetic recording media shown in FIGS. 1 to 5, tracking is conducted, for example, as follows. A detector, not shown, is integrally formed with a magnetic head, not shown, and detects a reflected light or a transmitted light from the detection region 31 by irradiation of light rays from a light source, not shown. Which one as between the reflected light and the transmitted light is to be detected, is determined depending upon which optical property as between the reflectance and the transmittance was utilized for recording on the servo tracks of the substrate. The optical property is different between the recorded areas and the non-recorded areas in the servo tracks, whereby the quantity of light received by the detector by the rotation of the magnetic recording medium will periodically changes, and an alternate signal will be output from the detector.

Here, in the case of a magnetic recorking medium of the present invention in which servo-signals modified by PWM are recorded, the detection region 31 is adequately larger than the modulation cycle by PWM, whereby the recorded signals in this region are averaged for output, whereby an optical record by PWM with and adequately high frequency will be detected as a signal which changes in an analogue fashion. Accordingly, the alternate signal output from the detector will be substantially the same signal as the signal 20. When the detection area is small, the signal of the PWM-modulation frequency will be contained in the output signal of the detector. In such a case, it can be removed by means of e.g. an electron filter.

The detected alternate signal has two frequency components i.e. the signals 21 and 22, which can be separated by means of a frequency separation means such as a band pass filter. As mentioned above, the phase difference between the signals 21 and 22 sequentially differs by $\delta$ from one track to the next, whereby the present position of the magnetic head can be detected by measuring the phase difference between the separated respective frequency components by e.g. a phase difference detector. Namely, when the magnetic head has an error relative to the center of the track, the servo-signal of the adjacent track will be mixed in proportion to the error. At that time, the phase difference between the signals 21 and 22 differs by $\delta$ between the adjacent tracks, whereby the phase difference to be detected will be an intermediate value corresponding to the above error. Therefore, by controlling the position of the magnetic head so that this phase difference will be the prescribed value, accurate tracking will be possible.

Various conventional apparatus may be employed as the servo apparatus for tracking. A servo circuit generally known as PLL (phase locked loop) is a servo circuit using the phase difference as the signal source, whereby accurate tracking can be carried out by controlling the head position by PLL, so that the phases of signals obtained by multiplying the above-mentioned two signals, respectively, by multiplication circuits so that the short wavelength component is multiplied four times, and the long wavelength component is multiplied 8 times, will agree to each other. Further, in a case where a servo apparatus is constructed using a digital signal processor, the rise times of the above-mentioned two signals are read by a digital signal processor, and their difference is computed to readily obtain a tracking error.

In the present invention, the above-mentioned servo-signals will be recorded by forming in a magnetic recording medium areas where an optical property such as light reflectance or light transmittance is locally different. As a method for recording servo-signals on the above-mentioned magnetic recording medium, it is possible to employ, for example, a method of irradiating a laser beam at a certain specified position on the surface of the magnetic recording medium or irradiating a light beam (such as a strobo light or ultraviolet rays) or an electron beam through a mask having light shielding areas and light-transmitting areas corresponding to the signals to be recorded. At the areas where the light is irradiated, the optical property such as the light reflectance or light transmittance will change due to the chemical change of the dye preliminarily incorporated in the magnetic recording medium, and such areas will be in a recorded state.

Figure 6:
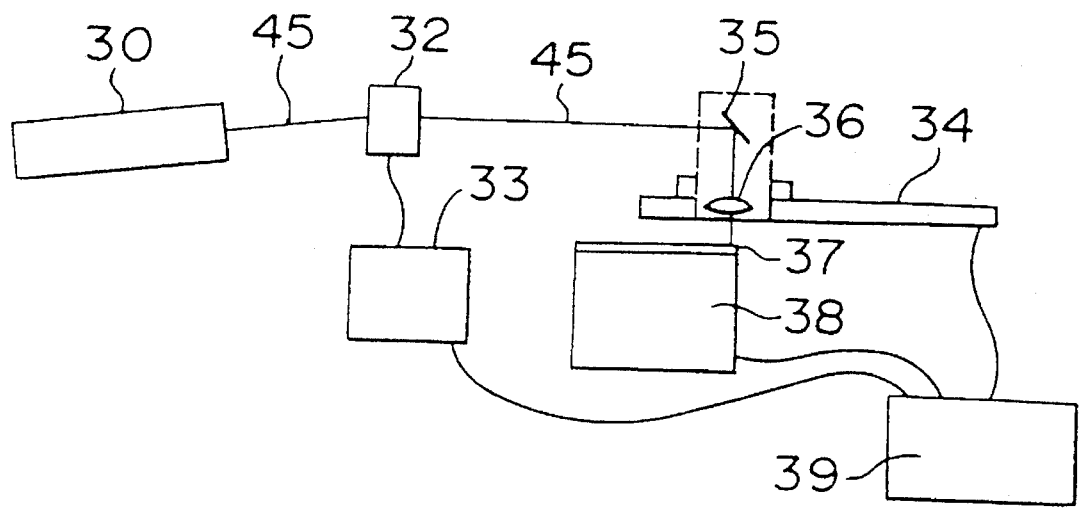
FIG. 6 is a schematic view illustrating a first embodiment of a device for writing a servo-signal pattern of a magnetic recording medium of the present invention.

FIG. 6 is a schematic view illustrating an embodiment of a method suitable for recording servo-signals. In FIG. 6, reference numeral 30 indicates a laser generator which generates a laser beam 45 under excitation by a powder source apparatus, not shown. Reference numeral 32 is AOM (accousto-optical modulator), which has a function of diffracting or deflecting the laser beam by a compressional wave in a crystal which is formed by applying a supersonic wave to the crystal placed in the optical path. By AOM 32, the diffraction angle changes due to the wavelength of the applied supersonic wave, and the amount of diffraction changes due to the intensity. This apparatus is constructed so that the amount of diffraction is controlled by changing the intensity of generation by the signals applied to the generator 33. The laser beam passed through AOM 32 is changed in its direction by a mirror 35 provided on a movable carriage of a linear motor 34 and then focused by an objective lens 36 provided on the above-mentioned movable carriage and irradiated to the magnetic recording medium 37. The magnetic recording medium 37 is rotated by a spindle motor 38, and the rotational angle is transmitted to the control apparatus 39. The control apparatus 39 is designed so that the focused area is set at a predetermined radial position by sending a signal to the linear motor 34, and then depending upon the rotational angle of the spindle motor, a signal for the intensity of the laser beam is sent to the generator 33 based on the predetermined pattern. The area of the magnetic recording medium where the laser beam is focused, will be heated, and the optical property such as the light reflectance or light transmittance will change due to e.g. a chemical change of the dye in the dye-containing layer, to form a servo track. This operation is repeated to obtain a necessary number of tracks, whereby optical signals will be recorded on the magnetic recording medium.

Figure 7:
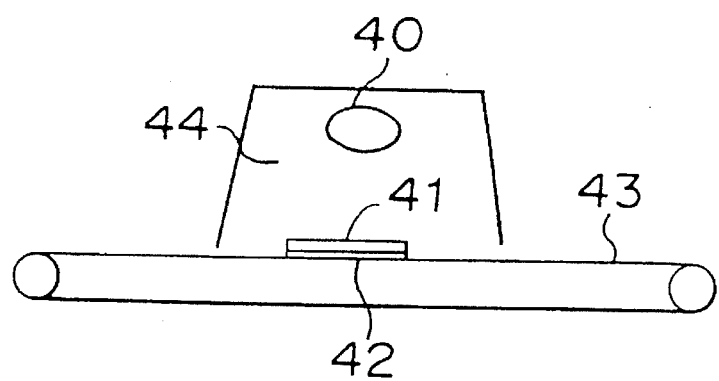
FIG. 7 is a schematic view illustrating a second embodiment of a device for writing a servo-signal pattern of a magnetic recording medium of the present invention.

FIG. 7 is a schematic view illustrating another embodiment of a method suitable for recording servo-signals. Reference numeral 40 indicates an ultraviolet light source, and numeral 41 indicates a mask. The mask 41 is the one in which patterns corresponding to writing signals are preliminarily formed by such a means as photoetching. Numeral 42 indicates a magnetic recording medium having a dye-containing layer, of which the optical property changes by irradiation of ultraviolet rays. This can be accomplished, as mentioned above, by incorporating a dye in a specific layer of the medium. The magnetic recording medium 42 will pass through an ultraviolet ray irradiation area 44 by a transporting means 43 at a predetermined speed in such a state that the mask 41 is overlaid thereon. As a result, the optical property of the medium such as the light reflectance or light transmittance, will change depending upon the shapes of the light transmitting areas of the mask 41, whereby optically readable signals will be recorded.

Further, a method of carrying out the above-described method by means of an electron beam, is particularly effective. On a thin metal plate which does not permit transmittance of an electron beam, such as a thin stainless steel plate having a thickness of about 10 μm, a pattern corresponding to servo-signals will be formed, and this is used as a mask. This mask is overlaid and centerized on a magnetic recording medium prepared by forming a dye-containing layer and a magnetic layer on a support, followed by stamping into a disk shape, attaching a hub thereto followed by centering, and then an electron beam is irradiated. The electron beam passes through the magnetic layer to form a desired servo pattern in the dye-containing layer.

When a laser or ultraviolet beam is employed, it is preferred that after forming the dye-containing layer on the substrate, the mask pattern is overlaid thereon, followed by irradiation with the laser or ultraviolet beam, and then the magnetic layer is formed. At the areas irradiated with energy rays, the optical property changes due to e.g. discoloration, whereby servo-signals will be formed.

At the time of reading servo-signals, it is possible to read them from the magnetic layer side in a case where the magnetic layer is made of a light transmitting material such as barium ferrite. On the other hand, if the light transmittance is insufficient, it is preferred to read them from the opposite side through the substrate. The magnetic layer may be provided on each side of the medium.

Further, additional signals may be recorded in the dye-containing layer so that optical reading other than servo-signals can be conducted. Such additional signals may be any signals so long as they have frequencies different from the servo-signals, and their number may be increased so long as the frequency separating means will permit. Further, the additional signals may be recorded as combined signals on the same servo tracks as for the servo-signals, or may be recorded at spatially different close positions.

Such additional signals may be used for recording e.g. information identifying the medium itself, information specifying the position in the rotational direction of the medium such as a sector number, or information for specifying the position in the radial direction of the medium such as a track number.

Such additional signals may be recorded in a dye-containing layer formed other than between the non-magnetic support and the magnetic layer. Such a dye-containing layer may be formed on the magnetic layer or on a non-magnetic support on the side where no magnetic layer is formed in the case where the magnetic layer is formed only on one side. Otherwise, a dye may be incorporated in the magnetic layer, so that the magnetic layer serves also as a dye-containing layer, or a dye may be incorporated in a non-magnetic support so that the non-magnetic support serves also as a dye-containing layer.

In a case where a dye-containing layer is to be formed on the magnetic layer, after coating a magnetic layer on a non-magnetic support, a dye-containing solution is coated on the surface directly or with another layer interposed, followed by drying. Further, this dye-containing coating layer may be used as or in combination with another coating layer for the purpose of lubricating or protecting the magnetic layer.

For example, in a case where it is used as a fluorine compound coating, a solution having a dye added to a suspension of a fluorinated hydrocarbon polymer such as tetrafluoroethylene teromer, ethylene-tetrafluoroethylene copolymer or hexafluoropropylene polymer, may be coated on the magnetic layer. Such a construction wherein another coating layer is used as a dye-containing layer, is preferred and advisable from the economical viewpoint.

As a method for forming a dye-containing coating layer, various conventional coating methods may be employed such as air doctor coating, blade coating, reverse roll coating and gravure coating.

In a case where a dye is to be incorporated in the magnetic layer, a dye may be added at the time of the preparation of a magnetic coating material containing a magnetic material, binder resin, etc., followed by kneading and dispersing.

In a case where a dye is to be incorporated in the non-magnetic support, it is common to knead a dye into a raw material resin at the time of preparation of a resin film such as a polyester to be used as the non-magnetic support, or a conventional blending method may be applied so that a dye is added at the time of preparing the raw material resin.

Now, specific embodiments of the present invention will be described in further detail with reference to Examples. However, it should be understood that the present invention is by no means restricted by the following Examples.

EXAMPLE 1

On a polyethylene terephthalate film having a thickness of 75 μm, a solution of a Ni-containing indoaniline dye of the following structural formula (II) was coated to form a dye-containing interlayer in a thickness of about 0.2 μm as dry thickness.

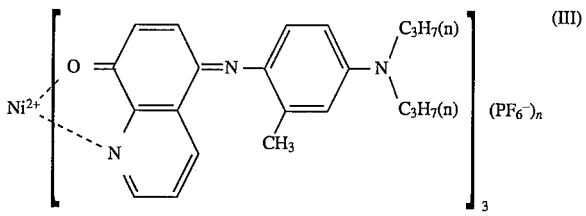

The Ni-containing indoaniline dye off the structural formula (II) has a peak of absorbance in the vicinity of 780 nm, and when heated to a temperature of from 200° to 400° C., it decomposes, whereby the above peak decreases to a negligible level.

Then, a magnetic coating material prepared by mixing 74 parts by weight of barium ferrite powder, 10 parts by weight of a polyurethane resin, 2 parts by weight of a phosphoric acid ester, 7 parts by weight of aluminum oxide, 1 part by weight of carbon black and 5 parts by weight of butyl stearate in tetrahydrofuran, was coated in a thickness of about 0.5 μm as dry thickness, to obtain a magnetic recording medium.

Figure 8:
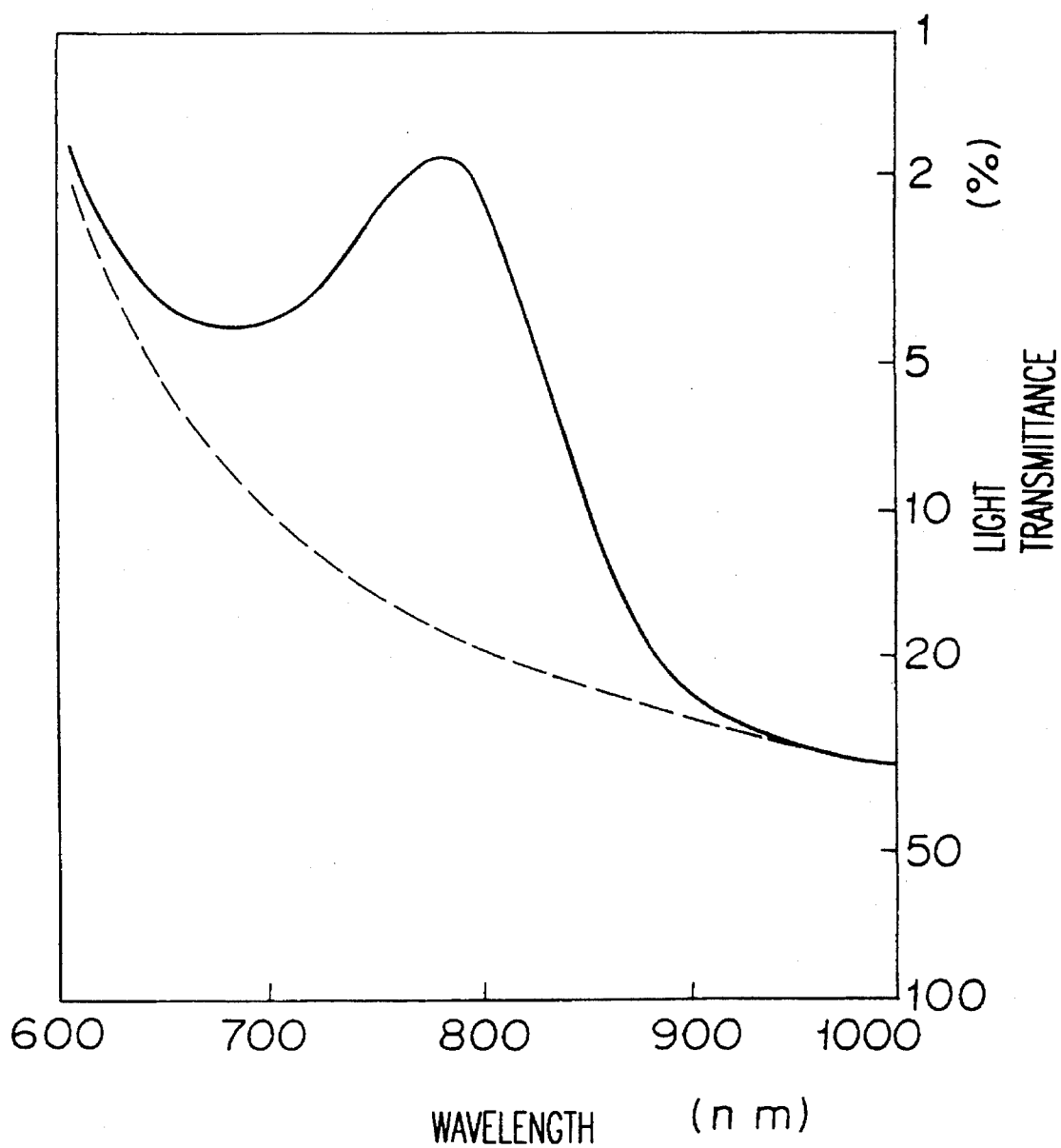
FIG. 8 is a view showing the absorbance curve of a magnetic recording medium prepared in Example 1.

The absorption curve of the magnetic recording medium thus prepared, is shown by a solid line in FIG. 8. In the Figure, the curve shown by a dotted line is the absorbance curve of a magnetic recording medium having no dye incorporated. The dye-containing magnetic recording medium has a peak of absorbance in the vicinity of 780 nm which is the wavelength of a semiconductor laser employed for detecting records. By local irradiation of energy rays (such as irradiation of a semiconductor laser with a high output power, the dye is locally decomposed and discolored, whereby the absorbance of that area will be substantially equal to the absorbance of the magnetic recording medium containing no dye. This diference is extremely large, and as shown in FIG. 8, the transmittance at 780 nm is 2% when the dye is contained, whereas it changes largely to 17% when no dye is contained. Accordingly, the recorded signals can easily be read by means of a semiconductor laser with a low output power.

Figure 9:
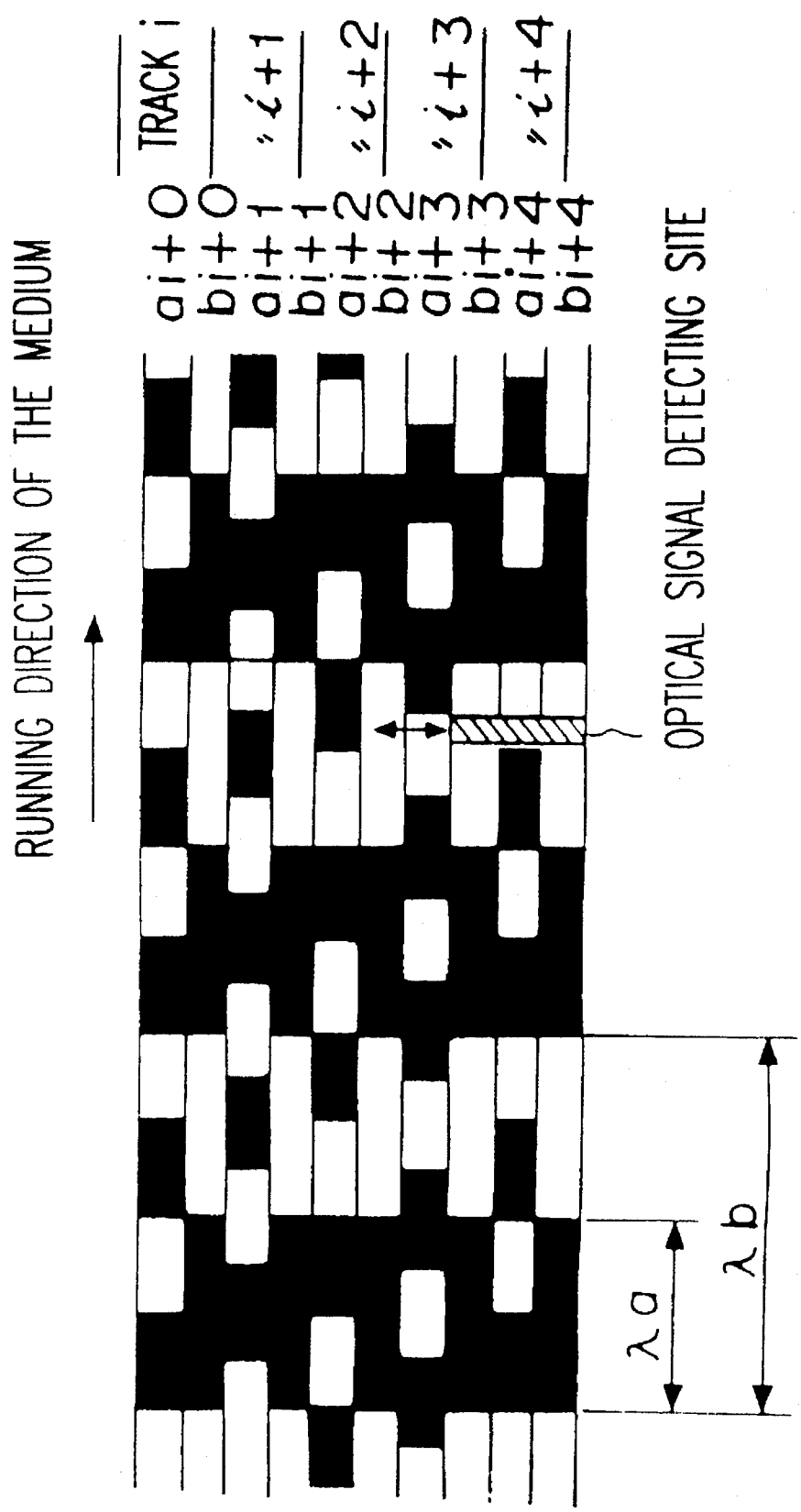
FIG. 9 is a detailed schematic view illustrating an embodiment of a pattern for writing an optical signal into a magnetic recording medium by irradiation of energy rays.
Figure 10:
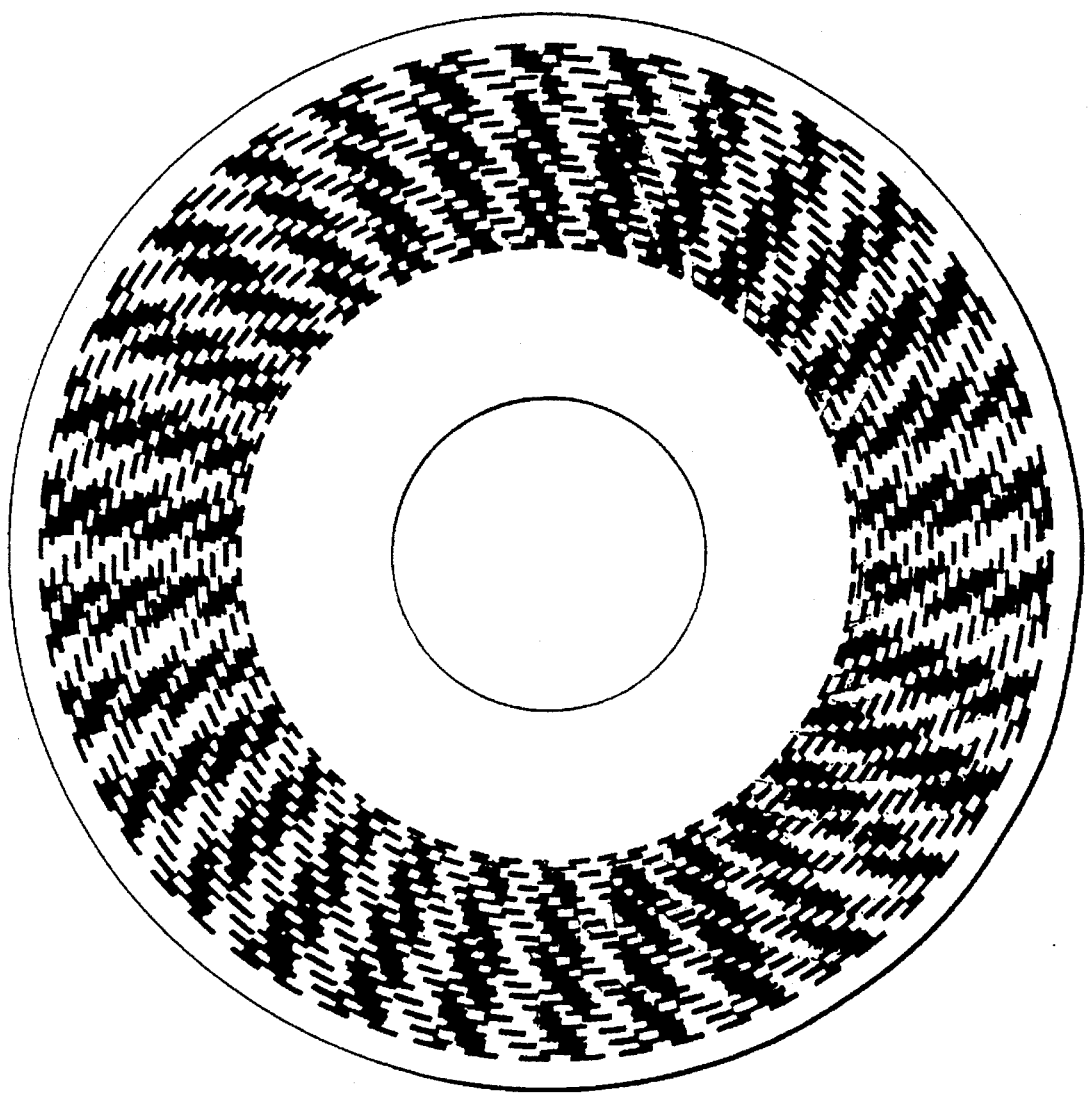
FIG. 10 is a schematic view illustrating an embodiment of a pattern for writing an optical signal into a magnetic recording medium by irradiation of energy rays.
Figure 11:
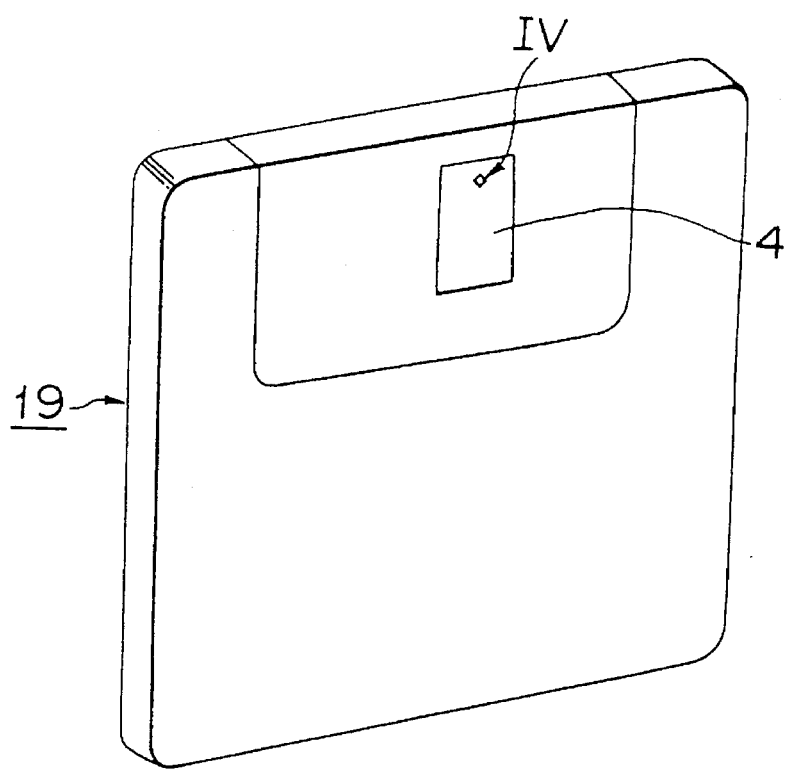
FIG. 11 is a perspective view of a floppy disk.
Figure 12:
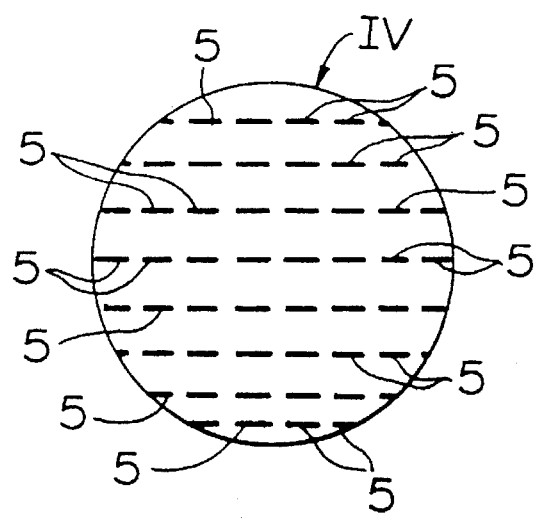
FIG. 12 is a schematic view of an enlarged disk surface of the portion 4 of FIG. 11.
Figure 13:
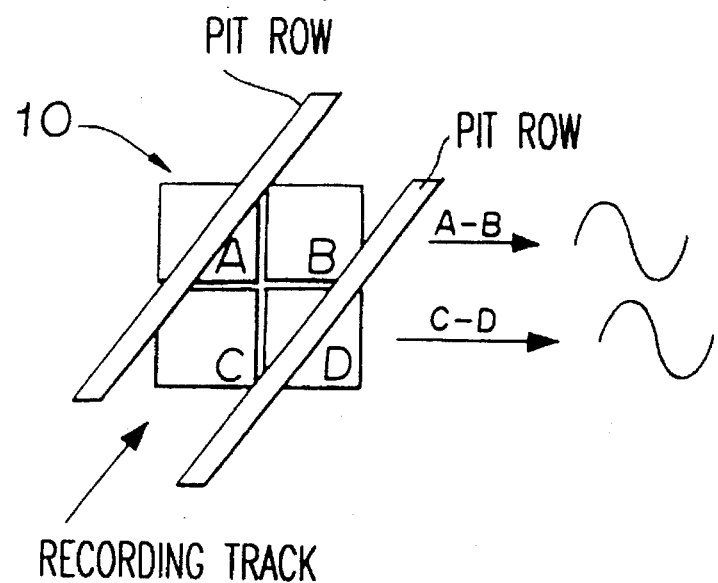
FIG. 13 is a schematic view illustrating a manner in which a servo-signal pattern of a conventional magnetic recording medium is read by a detector.
Figure 14:
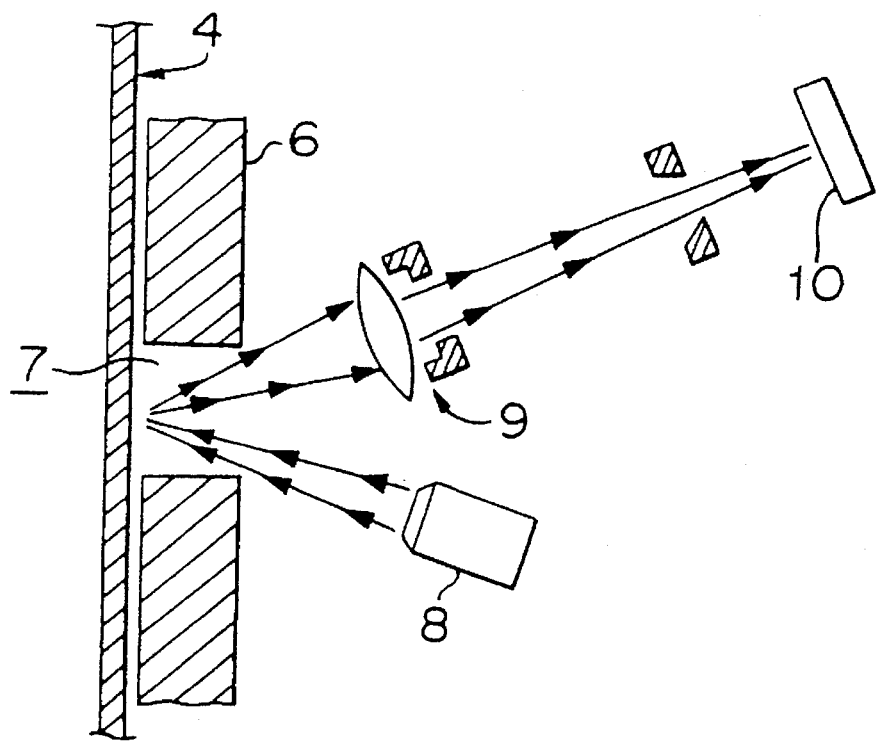
FIG. 14 is a cross-sectional view illustrating a servo-signal reading system of a conventional optical track servo mechanism.
Figure 15:
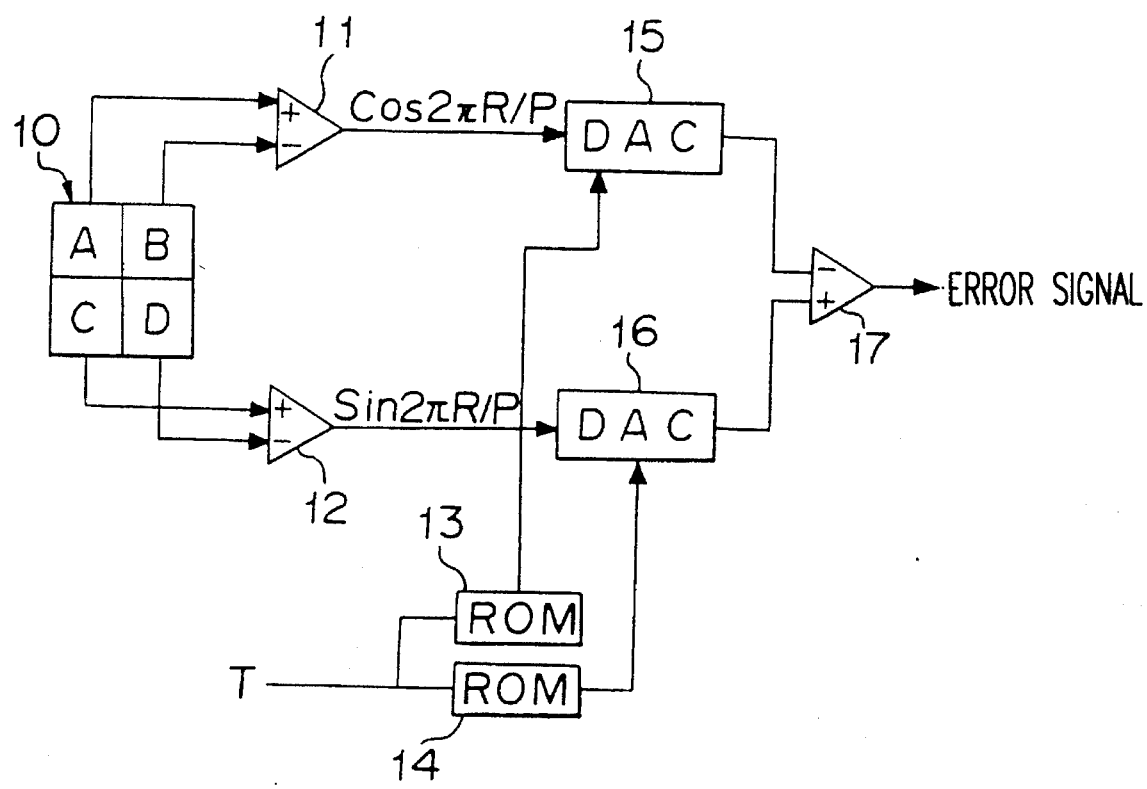
FIG. 15 is a block diagram of a detecting circuit of a conventional optical track servo mechanism.

An embodiment of a pattern for writing optical signals by irradiation of energy rays is shown in FIGS. 9 and 10. In an actual system, the pitch of the recorded signals is at a level of from 5 μm to 10 μm. However, in this Figure, the pitch is shown as enlarged in order to facilitate the understanding.

In each track (represented by i in FIG. 9), an optical record area $a_i$ having a short record wavelength $\lambda a$ and an optical record area $b_i$ having a long record wavelength $\lambda b$ ($\lambda b = 2\lambda a$) are provided, and optical records b have the same phase among the respective tracks, and optical records a have phases which differ by $\lambda a/4$ from one track to the next.

In FIG. 9, the light transmittance at the area shown by the oblique lines, is measured by a light detector integrally formed with a magnetic head. As the disk rotates, an alternate signal will be output from the detector. Since optical records having two types of wavelengths are provided, the output signal contains signals for two types of frequencies. The high frequency component generated by optical records a undergoes a phase change as the detector moves across the track, whereas the phase of the low frequency component generated by optical records b will remain constant. Accordingly, by separating the respective frequency components by a band path filter and measuring the phase difference between the two frequency components, the head position will be determined, and accurate tracking can be carried out by controlling the head position so that the phase difference will be the predetermined value.

To the above-mentioned magnetic recording medium, a semiconductor laser with a high output power is locally irradiated to record optical signals having a pattern as shown in FIGS. 9 and 10. Reading of the optical signals was conducted by means of a semiconductor laser with a low output power.

EXAMPLE 2

On a polyethylene terephthalate film having a thickness of 75 μm, an easily adhesive layer having the Ni-containing indoaniline dye of the above-mentioned structural formula (II) blended to an acrylurethane type adhesive resin, was formed in a thickness of about 0.2 μm as dry thickness. Then, a magnetic coating material prepared by mixing 74 parts by weight of barium ferrite powder, 10 parts by weight of a polyurethane resin, 2 parts by weight of a phosphoric acid ester, 7 parts by weight of aluminum oxide, 1 part by weight of carbon black and 5 parts by weight of butyl stearate in tetrahydrofuran, was coated in a thickness of about 0.5 μm as dry thickness, to obtain a magnetic recording medium.

The absorbance of the magnetic recording medium thus prepared, was measured, whereby it showed an absorbance curve similar to the one shown in FIG. 8.

To the above-mentioned magnetic recording medium, a semiconductor laser with a high output power was locally irradiated, whereby optical signals having a pattern as shown in FIGS. 9 and 10, were recorded. Reading of the optical signals was carried out by means of a semiconductor laser with a low output power.

EXAMPLE 3

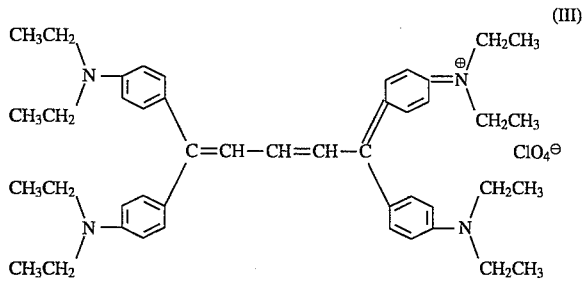

A methyl ethyl ketone solution containing 4 parts by weight of a polymethine type dye (λmax=about 820 nm) of the above structural formula (III), 72 parts by weight of a vinyl chloride/vinyl acetate/vinyl alcohol copolymer (VAGH, manufactured by Union Carbide) and 24 parts by weight of polyisocyanate, was prepared, and this solution was coated on one side of a polyethylene terephthalate film having a thickness of 75 μm, and the resin was cured by maintaining it at 60° C. for three days to form a dye-containing layer. The thickness of the dye-containing layer was about 1 μm, and the absorbance at λmax was about 1.0.

Then, to impart electrical conductivity to this film, a coating material containing 100 parts by weight of tin oxide powder (particle size: 0.03 μm), 15 parts by weight of a binder resin and 180 parts by weight of an organic solvent (methyl ethyl ketone/cyclohexanone=1/1), was prepared, and this coating material was coated on each side of the above film so that the film thickness after drying would be 0.5 μm. Further, a magnetic coating material comprising 100 parts by weight of barium ferrite magnetic powder, 4 parts by weight of a vinyl chloride-vinyl acetate copolymer, 4 parts by weight of polyurethane, 2 parts by weight of polyisocyanate, 1 part by weight of carbon black, 5 parts by weight of alumina, 5 parts by weight of butyl stearate and 280 parts by weight of an organic solvent (methyl ethyl ketone/cyclohexanone=1/1), was kneaded and dispersed by a ball mill to obtain a coating solution, which was then coated on each side of the above coated film, so that the layer thickness after drying would be 0.8 μm.

The surface smoothing treatment was carried out by calendar treatment, and then it was punched out into a 3.5 inch disk. Thereafter, the dye was partially decomposed and discolored by a semiconductor laser with a wavelength of 830 nm to obtain a pattern as shown in FIGS. 9 and 10. The light transmittance of 830 nm was about 11% at the areas where the dye was not decomposed. Whereas, the light transmittance at the decomposed areas was about 2%. By arranging the decomposed areas along the tracks in the circumferential direction, the above-mentioned servo information was recorded on a floppy disk.

INDUSTRIAL APPLICABILITY

With the magnetic recording medium of the present invention, specific servo-signals are recorded in a dye-containing layer suitable for writing signals by energy rays, whereby writing is possible with an energy dose relatively small as compared with conventional method of writing signals, and an inexpensive writing apparatus can be employed. Further, there will be no removal of material attributable to writing, and no dust or the like will be generated, whereby no cleaning step after writing will be required. Further, writing of signals by energy rays, does not adversely affect the magnetic recording material, and the areas where signals are written by energy rays, can be used for magnetic recording. Furthermore, the change of the optical property of the dye by irradiation of energy rays is large, and the signals can be detected with a high sensitivity.

Further, with the magnetic recording medium of the present invention, the head position can be measured by a single detector, whereby the apparatus can be down-sized, and the production costs can be reduced.

We claim:

1. A magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, characterized in that, in the dye containing layer, continuous servo-signals based on the change of the optical property of said dye by irradiation of energy rays are recorded on concentric tracks, wherein the continuous servo-signals recorded on the concentric tracks contain signals having two signals with different wavelengths superposed on each other, and said two signals are uniform, respectively, and the phase difference between said two signals differs sequentially from one track to the next.

2. The magnetic recording medium according to claim 1, wherein the layer containing a dye, is a layer having a dye compound dispersed in a binder resin.

3. The magnetic recording medium according to claim 1, wherein the layer containing a dye, is electrically conductive.

4. The magnetic recording medium according to claim 3, wherein the layer containing a dye, contains an electrically conductive substance.

5. The magnetic recording medium according to claim 4, wherein the electrically conductive substance is tin oxide.

6. A magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, characterized in that, in the dye containing layer, continuous servo-signals based on the change of the optical property of said dye by irradiation of energy rays are recorded on concentric tracks, wherein the dye is a polymethine-type dye which is a compound of the follow general formula (I):

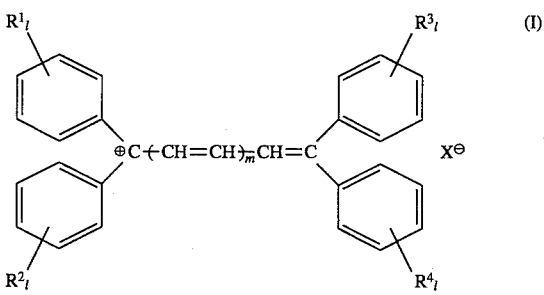

wherein, each of $R^1$ to $R^4$, is a hydrogen atom, a halogen atom, a hydroxyl group, a carboxyl group, an alkyl, amino, alkylamino, acryl, aryl, alkoxy, aralkyl, alkenyl or acyloxy group, X is an anion, m is 0, 1 or 2, and l is 1 or 2.

7. The magnetic recording medium according to claim 1, wherein the magnetic layer contains a barium ferrite magnetic powder and a binder resin.

8. The magnetic recording medium according to claim 1, wherein the servo-signals were recorded by irradiation of energy rays after forming the layer containing a dye on the non-magnetic support, and then the magnetic layer was formed.

9. The magnetic recording medium according to claim 1, wherein the servo-signals are recorded in the layer containing a dye, by irradiating electron beam through a pattern mask corresponding to the servo-signals.

10. The magnetic recording medium according to claim 1, wherein the irradiated light to record the servo-signals, is a laser having a wavelength within the maximum absorption wavelength ($\lambda$max) range of the dye.

11. A recording/reproducing method for a magnetic recording medium, which comprises recording/reproducing magnetic data by means of a magnetic recording medium of a disk shape having a magnetic layer containing a magnetic material formed on a non-magnetic support, characterized in that using, as said magnetic recording medium, a magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, where in the dye containing layer, continuous servo-signals based on the change of the optical property of said dye by irradiation of energy rays are recorded on concentric tracks, recording/reproducing of the magnetic data is conducted while tracking of a magnetic head is conducted by means of servo-signals detected by an optical means from the layer containing a dye, wherein the continuous servo-signals recorded on the concentric tracks contains signals having two signals with a different wavelengths superposed on each other, and said two signals are uniform, respectively, and the phase difference between said two signals differs sequentially from one track to the next.

12. The recording/reproducing method for a magnetic recording medium according to claim 11, wherein the layer containing a dye, is a layer having a dye compound dispersed in a binder resin.

13. The recording/reproducing method for a magnetic recording medium according to claim 11, wherein the layer containing a dye, is electrically conductive.

14. The recording/reproducing method for a magnetic recording medium according to claim 13, wherein the layer containing a dye, contains an electrically conductive substance.

15. The recording/reproducing method for a magnetic recording medium according to claim 14, wherein the electrically conductive substance is tin oxide.

16. A recording/reproducing method for a magnetic recording medium, which comprises recording/reproducing magnetic data by means of a magnetic recording medium of a disk shape having a magnetic layer containing a magnetic material formed on a non-magnetic support, characterized in that using, as said magnetic recording medium, a magnetic recording medium of a disk shape having a magnetic layer containing a magnetic material formed on a non-magnetic support and having, between the non-magnetic layer and the magnetic layer, a layer containing a dye, of which the optical property changes by irradiation of energy rays, where in the dye containing layer, continuous servo-signals based on the change of the optical property of said dye by irradiation of energy rays are recorded on concentric tracks, recording/reproducing of the magnetic data is conducted while tracking of a magnetic head is conducted by means of servo-signals detected by an optical means from the layer containing a dye, wherein the dye is a polymethine-type dye which is a compound of the following general formula (I):

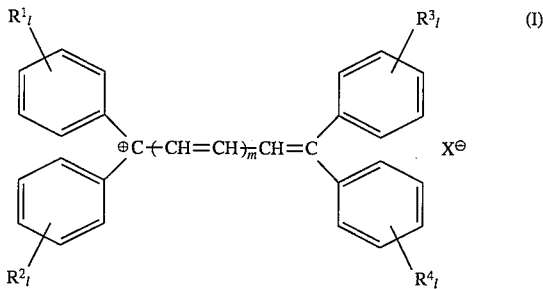

wherein, each of $R^1$ to $R^4$, is a hydrogen atom, a halogen atom, a hydroxyl group, a carboxyl group, an alkyl, amino, alkylamino, acryl, aryl, alkoxy, aralkyl, alkenyl or acyloxy group, X is an anion, m is 0, 1 or 2, and l is 1 or 2.

17. The recording/reproducing method for a magnetic recording medium according to claim 11, wherein the magnetic layer contains a barium ferrite magnetic powder and a binder resin.

18. An information processing apparatus for recording/reproducing magnetic data while tracking a magnetic head by means of servo-signals detected by an optical means from a magnetic recording medium, characterized in that a means is provided to read the servo-signals from a magnetic recording medium of a disk shape having a magnetic layer containing a magnetic material formed on a non-magnetic support and having, between the non-magnetic support and the magnetic layer, a layer containing a dye, of which the optical property changes by irradiation of energy rays, wherein in said dye containing layer, continuous servo-signals based on the change of the optical property of said dye by irradiation of energy rays, are recorded on concentric tracks, wherein the continuous servo-signals recorded on the concentric tracks contain signals having two signals with different wavelengths superposed on each other, and said two signals are uniform, respectively, and the phase difference between said two signals differ sequentially from one track to the next.

19. The information processing apparatus according to claim 18, wherein a means of separating the servo-signals read from the magnetic recording medium into frequency components corresponding to said different two wavelengths and a means for outputting a positional signal from the phase difference between said different two frequency components.

* * * * *